United States Patent [19]

Onishi et al.

[11] 4,360,842
[45] Nov. 23, 1982

[54] DATA PROCESSOR FOR RECORDING AND READING OUT CHECK DATA AND TRUE DATA IN A CASSETTE TAPE

[75] Inventors: Soichi Onishi, Yao; Shigeru Kitano, Nara, both of Japan

[73] Assignee: Sharp Kabushiki Kaisha, Osaka, Japan

[21] Appl. No.: 231,993

[22] Filed: Feb. 6, 1981

Related U.S. Application Data

[62] Division of Ser. No. 82,333, Oct. 5, 1979.

[30] Foreign Application Priority Data

Oct. 11, 1978 [JP] Japan .................................. 53-125308
Oct. 11, 1978 [JP] Japan ............................ 53-139741[U]

[51] Int. Cl.³ .......................... G11B 15/02; G11B 5/02
[52] U.S. Cl. .......................................... 360/25; 360/67
[58] Field of Search ......................... 360/25, 67, 53, 46

[56] References Cited

U.S. PATENT DOCUMENTS 3,430,215 2/1969 Krossa et al. ......................... 360/67
3,660,821 5/1972 Weber et al. ......................... 360/67
3,996,558 12/1976 Heun ..................................... 360/53
4,222,081 9/1980 Kamo et al. ........................... 360/67

Primary Examiner—Vincent P. Canney
Attorney, Agent, or Firm—Birch, Stewart, Kolasch & Birch

[57] ABSTRACT

A data reader reads data from a magnetic tape using a reproduction head. This data is presented to a loading control circuit which amplifies the signal produced by the reproduction head, as needed. The sufficiency of the volume level produced by the loading control circuit is detected by a volume adjustment detection circuit which detects the sufficiency of the signal level. If the signal level is insufficient, a buzzer is sounded indicating to the operator of the data reader that the gain level of the loading control circuit is insufficient. If the gain level is determined to be sufficient by the volume adjustment detection circuit, a signal path to a data detection circuit is enabled. The data detection circuit determines the presence of actual data and presents this data to a readout circuit.

8 Claims, 4 Drawing Figures

DATA PROCESSOR FOR RECORDING AND READING OUT CHECK DATA AND TRUE DATA IN A CASSETTE TAPE

This application is a divisional of copending application Ser. No. 082,333, filed on Oct. 5, 1979.

BACKGROUND OF THE INVENTION

The present invention relates to a data recorder for recording data into a cassette tape unit and a data reader for reading-out the recorded data. More particularly, the present invention relates to a data recorder for recording check data and true data into a cassette tape unit and a data reader for reading out the true data with the help of the check data.

Recently, an audio cassette tape has been employed for storing data in the form of analog information useful for an electronic apparatus of a stored program system. In introducing data from the audio cassette tape to an input means for the electronic apparatus, the data was transmitted through earphone terminals connected to a sound volume adjustment circuit for a cassette tape deck. Therefore, adjustment of sound volume greatly affected the reliability of the data introduced.

A conventional audio cassette tape format comprised only a non-recorded section and a recorded section. Data was entered in the recorded section while an appropriate error check operation was being performed. If errors were detected, the operator was informed of the presence of the errors and directed to adjust sound volume with the help of only his perception, and to repeat the entry operation from the beginning.

Thus, even using the conventional audio cassette tape format, it was difficult to adjust the amplitude to the correct sound volume, thereby resulting in inefficient data entry to a new cassette tape.

SUMMARY OF THE INVENTION

Accordingly, it is a primary object of the present invention to provide a new method for entering data into an audio cassette tape.

It is a further object of the present invention to provide an improved cassette tape format adapted for entering check data and true data therein and allowing the control of a sound volume through use of the check data.

It is a further object of the present invention to provide an improved cassette tape reader for enabling precise control for a sound volume in entering data.

It is another object of the present invention to provide an improved cassette tape reader for making sure that effective data is introduced into the cassette tape reader.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a data recorder for recording data in the form of audio or digital signals into a cassette tape, comprises a first circuit for recording check signals and a second circuit for recording true signals. The first circuit allows the check signals to be recorded in a first section of the cassette tape to check the amplitude of a sound volume in which the check signals are sounded. The second circuit enables the true signals to be recorded in a second section of the cassette tape under the condition that the amplitude of the sound volume of the check signals is adequately adjusted.

A data reader for reading out the thus recorded data includes a first detection circuit for determining whether the read-out signals have a sufficient level for reading out purposes, an announcing device for announcing the need to adjust a sound volume, and a read-out circuit for reading out true data from the cassette tape.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
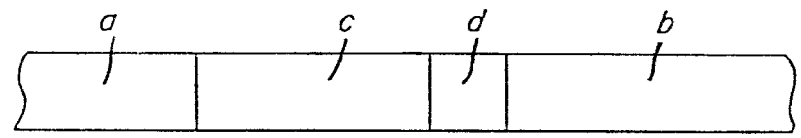
FIG. 1 is a format diagram of a recorded cassette tape according to the present invention.

FIG. 1 shows a format diagram of a cassette tape recorded according to the present invention. With reference to FIG. 1, the cassette tape comprises a non-recorded section a, a data section b, a volume adjustment section c, and a separator section d.

The non-recorded section a does not contain any signal information. The data section b is utilized for recording true or effective data. The effective data normally contains analog information. Such data may be of a digital form as in a high quality cassette tape. The volume adjustment section c includes check data for adjustment of a sound volume. The volume adjustment section c should be long enough for the operator to conduct volume adjustment. The separator section d is provided for separating and distinguishing the volume adjustment section c from the data section b. The separator section d contains no signal information, or alternatively predetermined code information which identifies and separates the separate volume adjustment section c from the separate data section b.

According to the present invention, volume adjustment is conducted on the basis of the volume adjustment data recorded in the volume adjustment section c, thereby precisely recording the effective data in the data section b thereafter.

Figure 2:
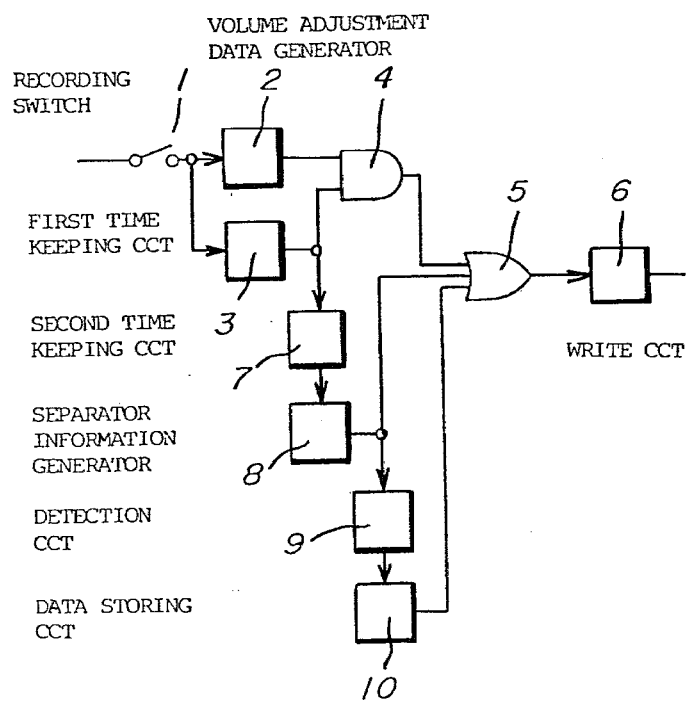
FIG. 2 is a block diagram of a recording circuit of a cassette tape deck for recording data in the form of the format diagram shown in FIG. 1.

FIG. 2 shows a block diagram of a recording circuit of the present invention. The recording circuit is activated to record data in the form of the format diagram defined in FIG. 1.

Referring to FIG. 2, the recording circuit comprises a recording switch 1, a volume adjustment data generator 2, a first time keeping circuit 3, an AND gate 4, an OR gate 5, a write circuit 6, a second time keeping circuit 7, a separator information generator 8, a detection circuit 9, and a data storing circuit 10.

In operation, the recording switch 1 is firstly turned conductive to initiate the recording operations. The volume adjustment data generator 2 and the first time keeping circuit 3 are then placed in operative conditions. The volume adjustment data is transferred from the volume adjustment data generator 2 to the write circuit 6 through the AND gate 4 and the OR gate 5 so that the data is recorded on the volume adjustment section c of the cassette tape.

The first time keeping circuit 3 counts a predetermined period of time for recording the volume adjustment data. During this predetermined period of time the first time keeping circuit 3 enables the transference of the volume adjustment data through the AND gate 4. The second time keeping circuit 7 is actuated in response to the turning off of the first time keeping circuit 3 so that the separator information generator 8 generates its separator information which is recorded in the separator section d of the cassette tape. The separator information is transferred to the write circuit 6 through the OR gate 5. The second time keeping circuit 7 controls the generation of the separator information from the separator information generator 8.

The detection circuit 9 detects the absence of transfer of separator information from separator information generator 8. After it is assured by the detection circuit 9 that the separator information has been completely transferred to the write circuit 6 for recording in the separator section d, (i.e., when the absence of transfer of separator information is detected) the detection circuit 9 is energized to enable the recordation of the effective data stored in the data storing circuit 10. The effective data enters the write circuit 6 through the OR gate 5 for recording the data in the data section b of the cassette tape.

The thus recorded effective data is loaded to an electronic apparatus which is controlled in a stored program system as stated below.

Figure 3:
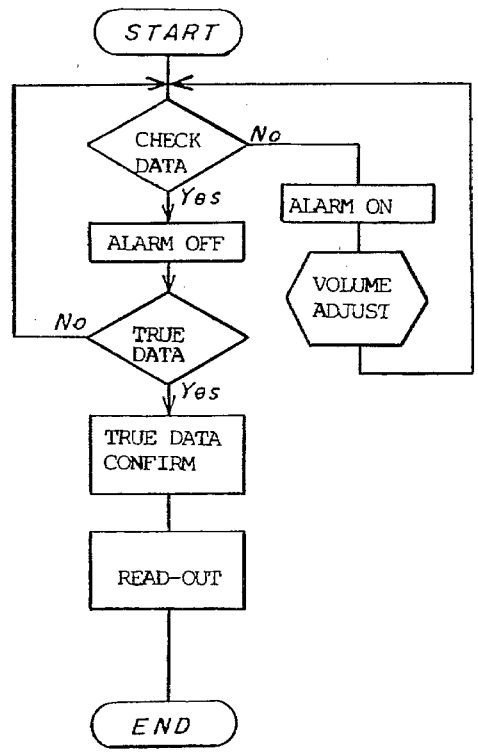
FIG. 3 is a flow chart for explaining reading out sequences of the present invention.
Figure 4:
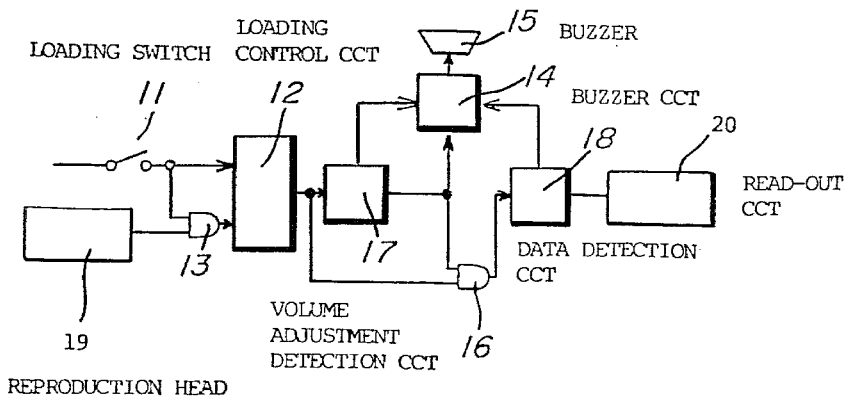
FIG. 4 is a block diagram of a reading out circuit of the cassette tape deck according to the present invention.

FIG. 3 illustrates loading operations by the electronic apparatus according to the present invention. FIG. 4 shows a read-out or loading circuit of the present invention.

Referring now to FIG. 4 the loading circuit comprises a loading switch 11, a loading control circuit 12, an AND gate 13, a volume adjustment detection circuit 17, an alarm or a buzzer circuit 14, an alarm such as an illuminator or a buzzer 15, an AND gate 16, a data detection circuit 18, a reproduction head 19, and a read-out circuit 20.

Operations of the loading circuit of FIG. 4 are described below according to the loading operations shown in FIG. 3.

The loading switch 11 is initially turned conductive to activate the loading control circuit 12 and the AND gate 13.

The AND gate 13 receives the volume adjustment data transferred from the reproduction head 19 at a first time. The volume adjustment data is admitted to the loading control circuit 12 through the AND gate 13.

After being appropriately amplified by the loading control circuit 12, the volume adjustment data is entered to the volume adjustment detection circuit 17 to determine whether the entered data possesses a sufficient level for reading out purposes. If not, the volume adjustment detection circuit 17 energizes the buzzer circuit 14 so that the buzzer 15 indicates to the operator that the volume adjustment data does not have such a sufficient level for reading out purposes.

The operator can then control the sound volume contained within the loading control circuit 12 to adjust the amplitude of the volume adjustment data. When the amplitude of the volume adjustment data becomes suitable for reading out operation, then another terminal from the volume adjustment detection circuit 17 prevents the buzzer circuit 14 from operating and allows the AND gate 16 to be conductive.

When, according to the travel of the cassette tape, the effective data is contained within the loading control circuit 12 through the use of the reproduction head 19, it is transferred to the data detection circuit 18 through the AND gate 16. The data detection circuit 18 determines whether the input data is effective. If so, it actuates the buzzer circuit 14 so that the buzzer 15 announces the transference of the new effective data to the data detection circuit 18 for reading out purposes. The data detection circuit 18 provides the effective data to the read-out circuit 20 for reading out operations.

While only certain embodiments of the present invention have been described, it will be apparent to those skilled in the art that various changes and modifications may be made therein without departing from the spirit and scope of the invention as claimed.

What is claimed is:

1. A data reader for reading out data in the form of signals contained on a magnetic tape comprising:
   reproduction head means for recalling information stored on said magnetic tape;
   means for initiating the read out of said information;
   control circuit means for variably amplifying said information recalled by said reproduction head means and producing an amplified output;
   volume level detection means receiving said amplified output and determining whether said amplified output has a signal level sufficient for proper readout;
   means for providing an indication of an insufficient signal level in response to a determination by said volume level detection means that said signal level is insufficient;
   data detection means for determining whether said information contained in said amplified output is actual data, said data detection means being operatively connected to said control circuit means only when said amplified output has a signal level sufficient for proper readout as determined by said volume level detection means.

2. The data reader of claim 1 further comprising read out means for utilizing said information contained within said amplified output.

3. The data reader of claim 2 wherein said volume level detection means provide an insufficient signal level signal to said means for providing when said signal level is insufficient; said reader further comprising;
   enablement means for selectively allowing said amplified signal to be applied to said data detection means;
   said volume level detection means further providing a sufficient signal level to said enablement means to allow said amplified signal to be applied to said data detection means.

4. The data reader of claim 2 wherein said information initially includes volume adjustment data;
   said volume level detection means utilizing said volume adjustment data to determine whether the signal level of said amplified data is sufficient.

5. The data reader of claim 4 wherein the output of said control circuit means may be adjusted.

6. The data reader of claim 3 wherein said information initially includes volume adjustment data;

said volume level detection means utilizing said volume adjustment data to determine whether the signal level of said amplified data is sufficient.

7. The data reader of claim 1, 2, 3, 4 or 6 wherein said means for providing includes a buzzer.

8. The data reader of claim 3 wherein said enablement means is an AND gate.

* * * * *